United States Patent [19]

Hara et al.

[11] Patent Number: 5,352,397

[45] Date of Patent: Oct. 4, 1994

[54] PROCESS FOR PRODUCING MULTILAYER MOLDED ARTICLE INCLUDING FOLDING OF A SKIN MATERIAL OVER A BACK OF A RESIN MATERIAL

[75] Inventors: Takahisa Hara, Kawanishi; Masahito Matsumoto, Ibaraki; Nobuhiro Usui, Takatsuki; Shigeyoshi Matubara, Osaka, all of Japan

[73] Assignee: Sumitomo Chemical Company, Limited, Osaka, Japan

[21] Appl. No.: 942,502

[22] Filed: Sep. 10, 1992

[30] Foreign Application Priority Data

Sep. 10, 1991 [JP] Japan .................. 3-230264

[51] Int. Cl.⁵ .............. B29C 43/18; B29C 43/20; B29C 53/00
[52] U.S. Cl. ...................... 264/153; 156/216; 156/309.9; 264/163; 264/257; 264/259; 264/266; 264/295
[58] Field of Search ............... 264/153, 163, 259, 266, 264/267, 275, 295, 257; 156/216, 309.9, 322; 425/292

[56] References Cited

U.S. PATENT DOCUMENTS

| 2,452,149 | 10/1948 | Richartz et al. | 264/155 |
| 4,692,108 | 9/1987 | Casano | 264/163 |
| 4,873,041 | 10/1989 | Masui et al. | 264/266 |
| 5,154,872 | 10/1992 | Masui et al. | 264/295 |

FOREIGN PATENT DOCUMENTS

| 127035 | 12/1984 | European Pat. Off. . | |
| 186016 | 7/1986 | European Pat. Off. | 264/163 |
| 324051 | 7/1989 | European Pat. Off. . | |
| 3434366 | 8/1985 | Fed. Rep. of Germany . | |
| 61-41517 | 2/1986 | Japan | 264/259 |
| 61-43523 | 3/1986 | Japan | 264/259 |
| 61-43525 | 3/1986 | Japan | 264/259 |
| 61-132330 | 6/1986 | Japan | 264/163 |
| 63-39320 | 2/1988 | Japan | 264/259 |
| 63-91225 | 4/1988 | Japan | 264/163 |
| 2-217227 | 8/1990 | Japan . | |
| 717556 | 10/1984 | United Kingdom . | |

OTHER PUBLICATIONS

Patent Abstracts of Japan, vol. 9, No. 245 (M-418)(1968) Oct. 2, 1985 (Abstract of Kokai 60-97816).

Patent Abstracts of Japan, vol. 10, No. 196 (M-497)(2252) Jul. 10, 1986 (Abstract of Kokai 61-41517).

*Primary Examiner*—Jay H. Woo
*Assistant Examiner*—Duane S. Smith
*Attorney, Agent, or Firm*—Birch, Stewart, Kolasch & Birch

[57] ABSTRACT

A multilayer molded article having a thermoplastic resin body and a skin material covering the resin body is produced by supplying a skin material between a pair of molds, holding the skin material between a skin material-holding frame which is moved in a direction perpendicular to a mold-closing direction and a skin material-supporting frame which is moved in the mold-closing direction, supplying a mass of a thermoplastic resin melt, and closing the molds to form a multilayer molded article, in which at least one moving member which moves forward or rearward in the mold closing direction is provided around a mold face and is recessed in the mold closing direction after the supply of the resin melt, at least one ejector which is provided on the skin material-holding frame is ejected to fold an edge of the skin material towards a center of the mold, and the moving member is forwarded toward the mold face so as to fold back the edge of the skin material over the back of the resin body.

4 Claims, 5 Drawing Sheets

PROCESS FOR PRODUCING MULTILAYER MOLDED ARTICLE INCLUDING FOLDING OF A SKIN MATERIAL OVER A BACK OF A RESIN MATERIAL

BACKGROUND OF THE INVENTION

1. Field of the Invention

The present invention relates to a process for producing a multilayer molded article comprising a body of a thermoplastic resin and a skin material. In particular, the present invention relates to a process for producing a multilayer molded article in which edges of the skin material are folded back over a back of the molded article of the thermoplastic resin.

The molded article produced by the process of the present invention can be used as, for example, an automobile part which is installed in which the edges of the skin materials are folded back over the back of the molded article.

2. Description of the Related Art

Hitherto, the above described kind of the molded article is produced by trimming the skin material and then folding the edges of the skin material by hand. However, such a folding process is troublesome and it is difficult to sharply fold some skin materials.

Japanese Patent Kokai Publication No. 137714/1986 and corresponding U.S. patent application Ser. No. 07/458,401 filed Dec. 28, 1989 and now U.S. Pat. No. 5238640 disclose a process for producing a multilayer molded article having a skin material which covers the resin body till its edges by means of a molding machine having a frame for fixing the skin material which is movably attached to one of male and female molds with expansion means in which the male mold has a sliding plane around the whole periphery of the male mold, and the frame for fixing the skin material and the female mold form a mechanism for cutting the skin material and a skin material-holding part therebetween. However the disclosed process does not fold back the edges of the skin material over the back of the resin body.

SUMMARY OF THE INVENTION

An object of the present invention is to provide a process for producing a multilayer molded article having skin material edges of which are folded back over a back of a resin body of the molded article.

According to the present invention, there is provided a process for producing a multilayer molded article comprising a thermoplastic resin body and a skin material covering the resin body, which process comprises steps of supplying a skin material between a pair of molds 1 and 7, holding said skin material between a skin material-holding frame 3 which is moved in a direction perpendicular to a mold-closing direction and a skin material-supporting frame 9 which is moved in the mold-closing direction, supplying a mass of a thermoplastic resin melt, and closing the molds to form a multilayer molded article, wherein an least one moving member 11 which moves forward or rearward in the mold closing direction is provided around a mold face 8 and is recessed in the mold closing direction after the supply of said resin melt; at least one ejector 5 which is provided on the skin material-holding frame 3 is ejected to fold an edge 19 of the skin material towards a center of the mold; and the moving member 11 is forwarded toward the mold face 8 so as to fold back the edge of the skin material over the back of the resin body.

BRIEF DESCRIPTION OF THE INVENTION

FIGS. 1 to 6 schematically show cross sections of a molding apparatus in various steps of one embodiment of the molding process of the present invention respectively, FIGS. 7 and 8 schematically show cross section of a molding apparatus used in another embodiment of the molding process of the present invention; and FIG. 9 schematically shows a cross section of a molding apparatus used in a further embodiment of the molding process of the present invention.

DETAILED DESCRIPTION OF THE DRAWINGS

Specific examples of the skin material are woven or nonwoven fabric, nets made of fibers or thermoplastic resins, paper, metal foils, and a sheet or a film of a thermoplastic resin or a thermoplastic elastomer. The skin material may be decorated with uneven patterns such as grain patterns, printing, dying and the like. In addition, the skin material may be made of foamed materials of thermoplastic resins, thermosetting resins and rubbers. Also, a laminate comprising at least two layers each made of the same material or different materials which are bonded to each other with an adhesive can be used as the skin material.

As the thermoplastic resin to be molded by the process of the present invention, any of those conventionally used in compression molding, injection molding and extrusion molding can be used. The thermoplastic resins to be used according to the present invention include expandable or non-expandable resins such as thermoplastic resins (e.g. polypropylene, polyethylene, polystyrene, acrylonitrile-styrene-butadiene block copolymers, polyamide, etc.) and thermoplastic elastomers (e.g. ethylene-propylene block copolymers, styrene-butadiene block copolymers, etc.). The resin may contain at least one additive such as fillers (e.g. inorganic fillers and glass fibers), pigments, lubricants, antistatic agents and the like.

Now, the process of the present invention will be explained with reference to the accompanying drawings.

FIGS. 1–6 schematically shows cross sections of a molding apparatus in several steps of the process of the present invention.

Figure 1:
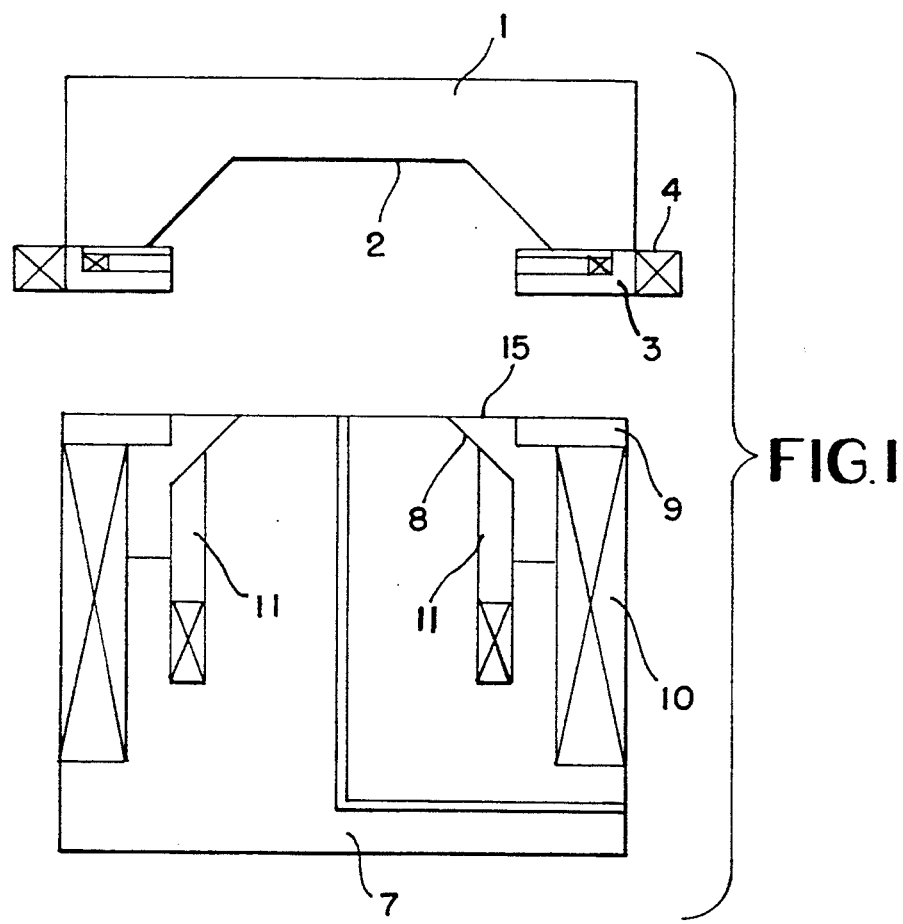
Figure 2:
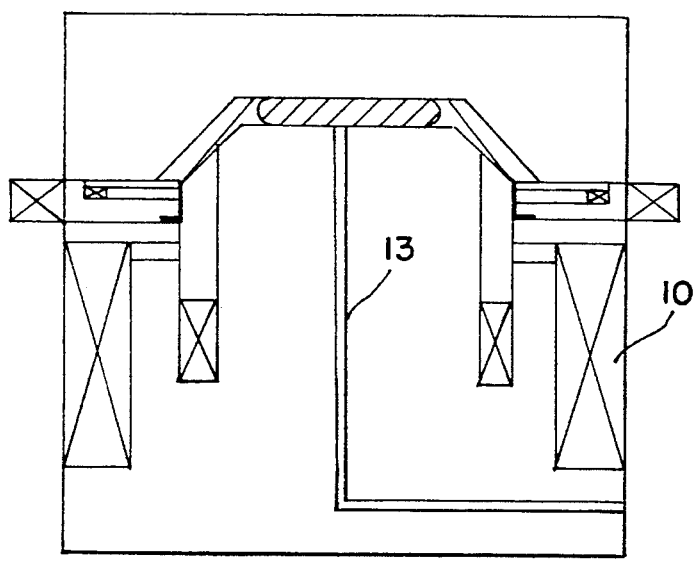
Figure 3:
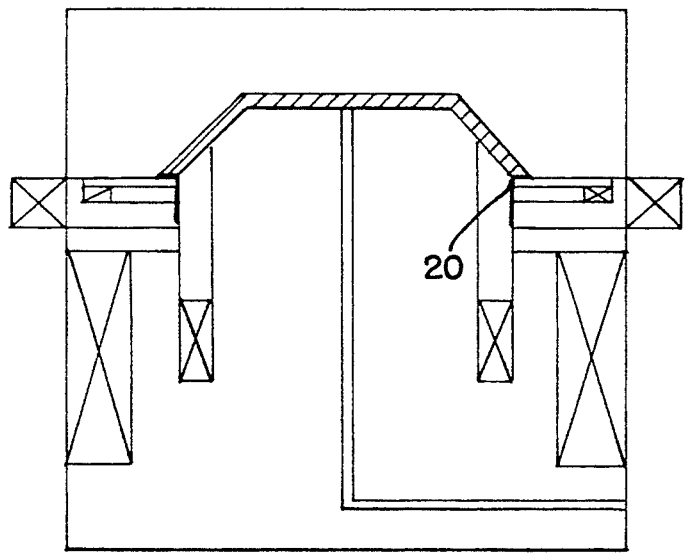

As shown in FIG. 1, on a peripheral surface of a mold face 2 of an upper mold 1, there is provided a skin material-holding frame 3 which is moved in a direction perpendicular to a mold-closing direction by expansion members 4. On an outer peripheral surface of a mold face 8 of a lower mold 7, there is provided a skin material-supporting frame 9 which is moved by expansion members 10 in the mold-closing direction. A skin material 15 is provided between the upper and lower molds 1, 7, respectively, and the molds are closed to hold the skin material 15 between the skin material-holding frame 3 and the skin material-supporting frame 9. Then, a mass of a thermoplastic resin melt is supplied through a resin supply conduit 13 as shown in FIG. 2. Since a tension is applied on the skin material, edges of the skin material slightly slide inwardly as shown in FIG. 3. Thereafter, the mold is cooled to complete the molding.

Figure 4:
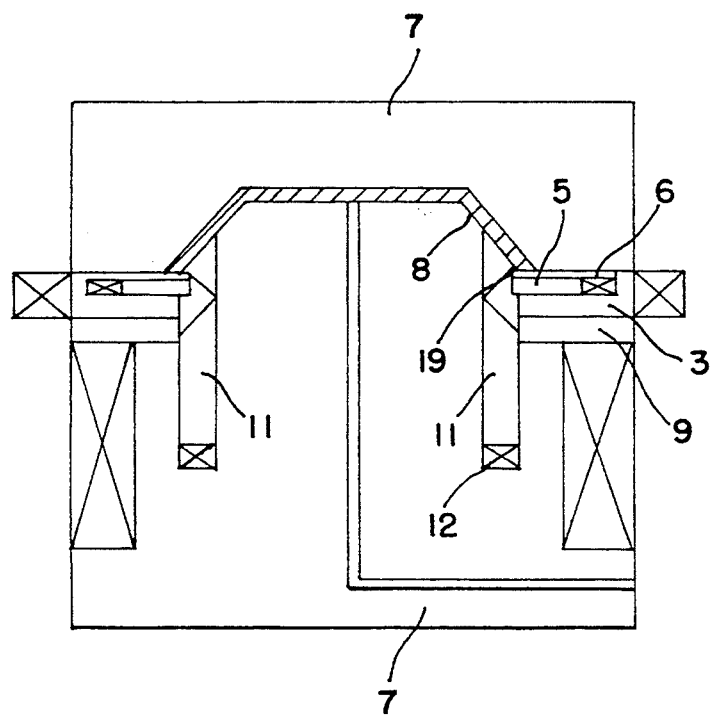

Next, moving members 11, which acre positioned around the mold face 8, are recessed in the mold closing direction using expansion members 12, and ejectors 5 are ejected with expansion members 6 into spaces which are formed by the recession of the moving members 11, whereby the edges 19 of the skin material 15 are folded towards a center of the mold as shown in FIG. 4.

Figure 5:
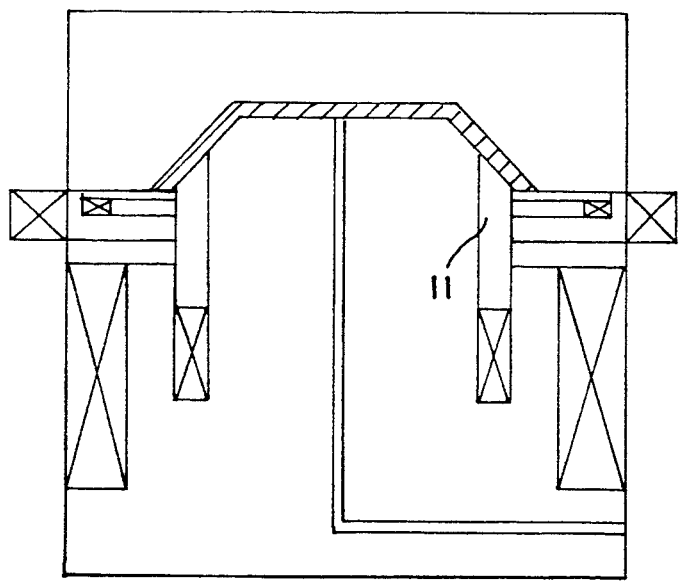
Figure 6:
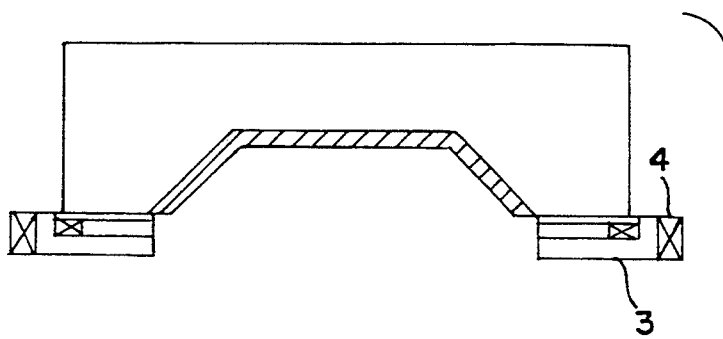
Figure 6:
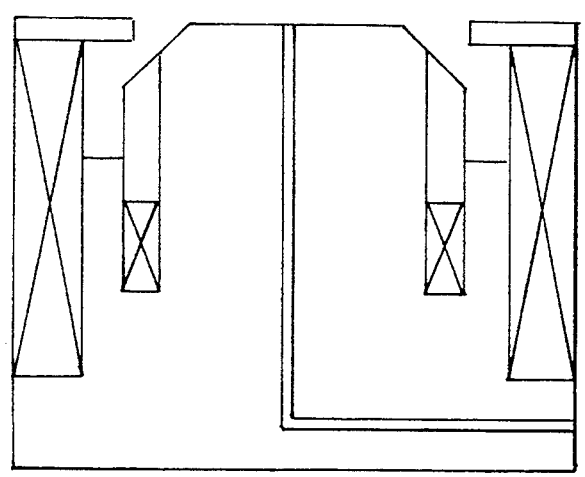

Then, as shown in FIG. 5, the moving members 11 are forwarded until they reach the molding face so that the edges of the skin material are folded back onto the resin body. Thereafter, as shown in FIG. 6, the molds are opened, The skin material-holding frames are withdrawn outwardly and the multilayer molded article is removed from the mold.

As the expansion members 4, 6, 10 and 12, air cylinders, hydraulic cylinders and the like may be used.

Figure 7:
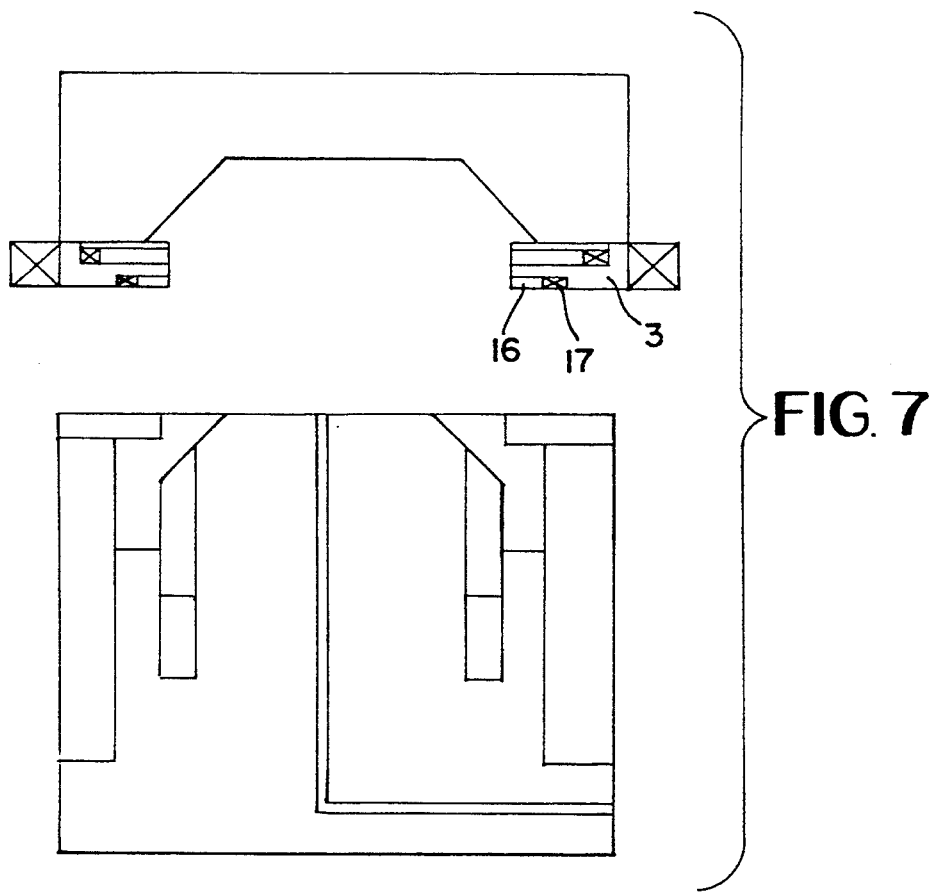
Figure 8:
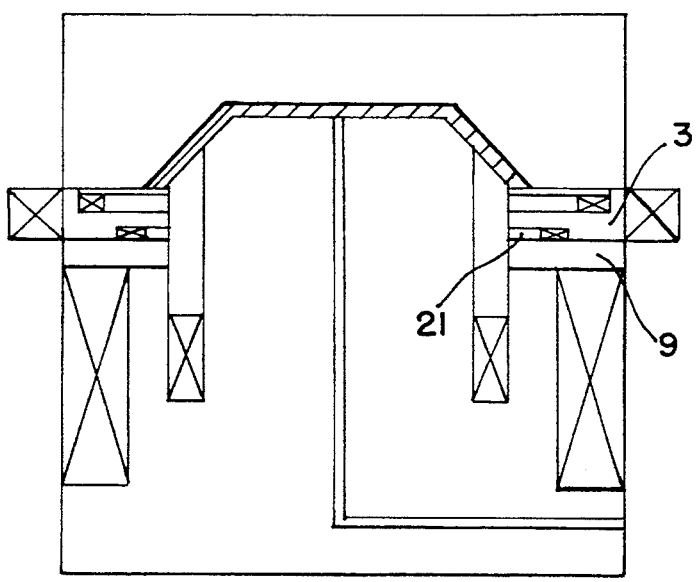

In another embodiment shown in FIG. 7, cutting blades 16 and expansion members 17 can be provided on the skin material-holding frame 3. As shown in FIG. 8, after the resin melt is supplied, the molds are closed, the skin material is held between the skin material-holding frame 3 and the skin material-supporting frame 9, and the cutting blades are forwarded to cut marginal parts of the edges of the skin material. In this method, it is not necessary to adjust the size or length of the skin material, and the edges have sufficient lengths for folding them with the ejectors.

As the expansion members 17, air cylinders, hydraulic cylinders and the like may be used.

Figure 9:
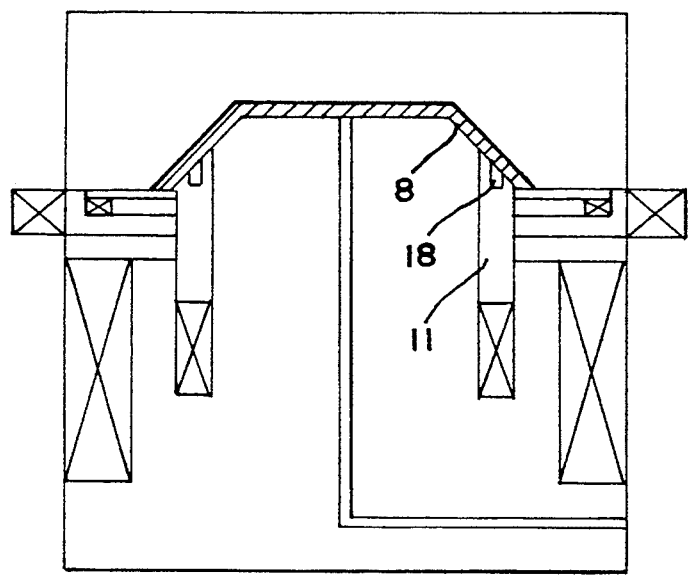

In a further embodiment shown in FIG. 9, heaters 18 for heating the edges of the skin material for a Short time may be provided at tip ends of the moving member 11. With the heaters, parts of the back of the molded resin are molten. Thereafter, the moving members are lowered, the edges of the skin materials are folded towards the center of the mold and the the moving members are lifted to adhere the edges of the skin material to the molten parts of the molded resin.

As shown in FIG. 3, at parts of the skin material-holding frame corresponding to folded parts of the skin-material edges, heaters 20 can be provided to locally heat the skin material for a short time so that the edges of the skin material can be sharply folded back over the back of the resin body.

PREFERRED EMBODIMENTS OF THE INVENTION

The present invention will be explained by following Examples.

EXAMPLE 1

Using the apparatus and method shown in FIGS. 7 and 8, a multilayer molded article was formed.

As a thermoplastic resin, Sumitomo Noblen (trademark) AX 568 (Sumitomo Chemical Co., Ltd.) having a melt flow index of 65 was used. As a skin material, a laminate of a polyvinyl chloride sheet having a thickness of 0.7 mm a surface of which was embossed and a foamed polypropylene sheet (15 times expansion) having a thickness of 3.0 mm (manufactured by Toray) was used.

Between an upper mold heated at 40° C. and a lower mold heated at 30° C., the skin material was provided and held between the skin material-holding frame and the skin material-supporting frame. Then, the thermoplastic resin melt heated at 200° C. was supplied through the resin supply conduit, the mold was closed under molding pressure of 50 kg/cm$^2$, and the edges of the skin material were cut by projecting the cutting blades which were provided on the skin material-holding frame.

Thereafter, the moving members 11 were recessed from the mold face, and the ejectors 5 were ejected to fold the edges of the skin material 15 towards the center of the mold. The moving members 11 were lifted up to fold the edges of the skin material over the back of the molded resin body.

In the multilayer molded article, the edges of the skin material were precisely folded back over the back of the resin body.

EXAMPLE 2

Using the apparatus and method shown in FIG. 9, a multilayer molded article was formed. The heaters 18 were provided at the tip ends of the moving members 11 at constant intervals.

As a thermoplastic resin, Sumitomo Noblen (trademark) BP 5077 (Sumitomo Chemical Co., Ltd.) containing 15% by weight of talk and having a melt flow index of 40 was used. As a skin material, a polyvinyl chloride sheet having a thickness of 0.7 mm a surface of which was embossed and which was lined with an expandable fabric was used.

Between an upper mold heated at 40° C. and a lower mold heated at 30° C., The skin material was provided and held between the skin material-holding frame and the skin material-supporting frame. Then, the thermoplastic resin melt heated at 200° C. was supplied through the resin supply conduit, the mold was closed under molding pressure of 50 kg/cm$^2$, and the edges of the skin material were cut by projecting the cutting blades which were provided on the skin material-holding frame. Simultaneously, parts of the back of the molded resin were molten with the heaters 18.

Thereafter, the moving members 11 were recessed from the molding face, and the ejectors 5 were ejected to fold the edges of the skin material 15 towards the center of the mold. The moving members 11 were lifted up to fold the edges of she skin material over the back of the molded resin body so that the edges were bonded to the molten parts of the resin body at the constant intervals.

In the multilayer molded article, the edges of the skin material were precisely folded back and bonded to the back of the resin body.

What is claimed is:

1. A process for producing a multilayer molded article comprising a thermoplastic resin body and a skin material covering the resin body, which process comprises steps of:

supplying a skin material between a pair of upper and lower molds;

closing the molds a predetermined distance for holding said skin material between a skin material-holding frame which is movable in a direction perpendicular to a mold-closing direction and a skin material-supporting frame which is movable in the mold-closing direction;

supplying a mass of a thermoplastic resin melt between the lower mold and the skin material;

closing the molds and pressing a thermoplastic resin melt to form a multilayer molded article;

retracting at least one moving member, which moves forward or rearward in the mold closing direction and is provided around a periphery of the mold face, away from the mold face after the closing of the molds;

ejecting at least one ejector, which is provided on the skin material-holding frame and movable in a direction perpendicular to the mold closing direction, to fold an edge of the skin material towards a center of the mold; and advancing said at least one moving member until it reaches the mold face so as to fold back the edge of the skin material over the back of the resin body.

2. The process according to claim 1, wherein said skin material-holding frame includes at least one cutting blade, and a marginal edge of the skin material is cut with the at least one cutting blade after which said at least one moving member is retracted from the mold face.

3. The process according to claim 1, further comprising the step of melting a part of the back of the resin body with a heater provided at a tip end of said at least one moving member prior to the steps of retracting said at least one moving member away from the mold face, advancing the ejector to fold the edge of the skin material towards the center of the mold, and advancing said at least one moving member toward the mold face so as to fold the edge of the skin material over the back of the resin body and bond the edge of the skin material to the molten part of the resin body.

4. The process according to claim 1, further comprising the step of partly heating the skin material with a heater provided at a part of the skin material-holding frame corresponding to the folded part of the skin material and folding the edge of the skin material towards the center of the mold.

* * * * *